(12) United States Patent
Mountz

(10) Patent No.: US 11,147,392 B2
(45) Date of Patent: *Oct. 19, 2021

(54) PLAY YARD

(71) Applicant: Wonderland Switzerland AG, Steinhausen (CH)

(72) Inventor: Jonathan K. Mountz, Birdsboro, PA (US)

(73) Assignee: Wonderland Switzerland AG, Steinhausen (CH)

(*) Notice: Subject to any disclaimer, the term of this patent is extended or adjusted under 35 U.S.C. 154(b) by 577 days.

This patent is subject to a terminal disclaimer.

(21) Appl. No.: 15/961,899

(22) Filed: Apr. 25, 2018

(65) Prior Publication Data
US 2018/0303250 A1  Oct. 25, 2018

Related U.S. Application Data

(60) Provisional application No. 62/489,830, filed on Apr. 25, 2017, provisional application No. 62/635,181, filed on Feb. 26, 2018.

(51) Int. Cl.
*A47D 13/06* (2006.01)
*A47D 7/00* (2006.01)
(Continued)

(52) U.S. Cl.
CPC ........... *A47D 13/063* (2013.01); *A47D 7/002* (2013.01); *A47D 9/005* (2013.01); *A47D 13/061* (2013.01); *A47D 15/003* (2013.01)

(58) Field of Classification Search
CPC .... A47D 13/063; A47D 13/061; A47D 13/06; A47D 9/00; A47D 9/005; A47D 7/00; A47D 7/002; A47D 15/003; A47D 15/001
(Continued)

(56) References Cited

U.S. PATENT DOCUMENTS 2,908,021 A * 10/1959 Fulton .................. A47D 13/063
5/99.1
2,991,486 A * 7/1961 Hamilton ............. A47D 13/063
5/98.1
(Continued)

FOREIGN PATENT DOCUMENTS

CN        2922647 Y    7/2007
CN      101291605 A   10/2008
(Continued)

*Primary Examiner* — Robert G Santos
(74) *Attorney, Agent, or Firm* — Winston Hsu

(57) ABSTRACT

A play yard comprises two brackets, two rail members, two support frames, a central member, a plurality of connecting members and a latch mechanism. The rail members are pivotally connected to the brackets. Each of the support frames comprises two upper support members and a lower support member. The upper support members are pivotally connected to the brackets. The lower support member is pivotally connected to the upper support members. The connecting members are pivotally connected to the central member and the lower support member. The latch mechanism is configured to lock or unlock the connecting members. When the latch mechanism locks the connecting members, the rail members, the upper support members, the lower support member and the connecting members are unfolded. When the latch mechanism unlocks the connecting members, the rail members, the upper support members, the lower support member and the connecting members are able to be folded.

14 Claims, 19 Drawing Sheets

(51) Int. Cl.
*A47D 15/00* (2006.01)
*A47D 9/00* (2006.01)

(58) Field of Classification Search
USPC .......................................... 5/99.1, 98.1, 93.1
See application file for complete search history.

(56) References Cited

U.S. PATENT DOCUMENTS

| | | | | |
|---|---|---|---|---|
| RE25,195 E | * | 7/1962 | Hamilton | A47D 13/063 5/98.1 |
| 3,999,229 A | * | 12/1976 | Wyss | A47D 7/002 5/99.1 |
| 4,635,305 A | * | 1/1987 | Wyss | A47D 7/002 5/99.1 |
| 5,193,234 A | * | 3/1993 | Joaquin | A47D 7/002 5/99.1 |
| 6,434,767 B1 | * | 8/2002 | Welsh, Jr. | A47D 7/04 5/93.2 |
| 7,770,245 B2 | * | 8/2010 | Cheng | A47D 13/063 5/93.1 |
| 9,345,339 B2 | * | 5/2016 | Wang | A47D 7/04 |
| 9,901,187 B2 | * | 2/2018 | Burkholder | A47D 9/005 |
| RE48,148 E | * | 8/2020 | Wang | A47D 7/04 |
| 2002/0092094 A1 | * | 7/2002 | Welsh, Jr. | A47D 11/007 5/95 |
| 2009/0025148 A1 | * | 1/2009 | Cheng | A47D 7/04 5/655 |
| 2014/0165288 A1 | * | 6/2014 | Wang | A47D 7/04 5/99.1 |
| 2014/0208505 A1 | * | 7/2014 | Burkholder | A47D 9/005 5/99.1 |
| 2014/0283298 A1 | | 9/2014 | Cheng | |
| 2018/0303250 A1 | * | 10/2018 | Mountz | A47D 13/063 |
| 2019/0261783 A1 | * | 8/2019 | Mountz | A47D 13/063 |

FOREIGN PATENT DOCUMENTS

| | | |
|---|---|---|
| CN | 104382422 A | 3/2015 |
| CN | 104510224 A | 4/2015 |
| CN | 105982467 A | 10/2016 |

* cited by examiner

PLAY YARD

CROSS REFERENCE TO RELATED APPLICATIONS

This application claims the benefit of U.S. Provisional Application No. 62/489,830, which was filed on Apr. 25, 2017, and is incorporated herein by reference and U.S. Provisional Application No. 62/635,181, which was filed on Feb. 26, 2018, and is incorporated herein by reference.

BACKGROUND OF THE INVENTION

1. Field of the Invention

The invention relates to a play yard and, more particularly, to a play yard capable of being folded or unfolded easily and rapidly.

2. Description of the Prior Art

For a parent or care giver, a play yard is a practical tool to take care infants or children. In general, the play yard provides rest or entertainment space for infants or children. To reduce space occupied by the play yard for shipment or storage, most of the play yards are foldable so far and the size of the play yard can be reduced after being folded. However, the folding and unfolding process of the conventional play yard requires multiple steps, such that the operation is inconvenient for the parent or care giver.

SUMMARY OF THE INVENTION

An objective of the invention is to provide a play yard capable of being folded or unfolded easily and rapidly.

According to an embodiment of the invention, a play yard comprises two brackets, two rail members, two support frames, a central member, a plurality of connecting members and a latch mechanism. The rail members are pivotally connected to the brackets. Each of the support frames comprises two upper support members and a lower support member. The upper support members are pivotally connected to the brackets. The lower support member is pivotally connected to the upper support members. The connecting members are pivotally connected to the central member and the lower support member. The latch mechanism is configured to lock or unlock the connecting members. When the latch mechanism locks the connecting members, the rail members, the upper support members, the lower support member and the connecting members are unfolded with respect to each other. When the latch mechanism unlocks the connecting members, the rail members, the upper support members, the lower support member and the connecting members are able to be folded with respect to each other.

As mentioned in the above, the invention utilizes the latch mechanism to lock or unlock the connecting members, so as to unfold or fold the play yard. When the rail members, the upper support members, the lower support member and the connecting members are unfolded with respect to each other, the latch mechanism locks the connecting members, such that the play yard can be situated in the unfolded state stably. If a user wants to fold the play yard for shipment or storage, the user can operate the latch mechanism to unlock the connecting members and then lift the central member, such that the rail members, the upper support members, the lower support member and the connecting members rotate toward the center of the play yard. Consequently, the rail members, the upper support members, the lower support member and the connecting members are folded with respect to each other. Accordingly, the folding and unfolding process of the play yard of the invention can be performed with minimal steps, such that the operation is very convenient for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
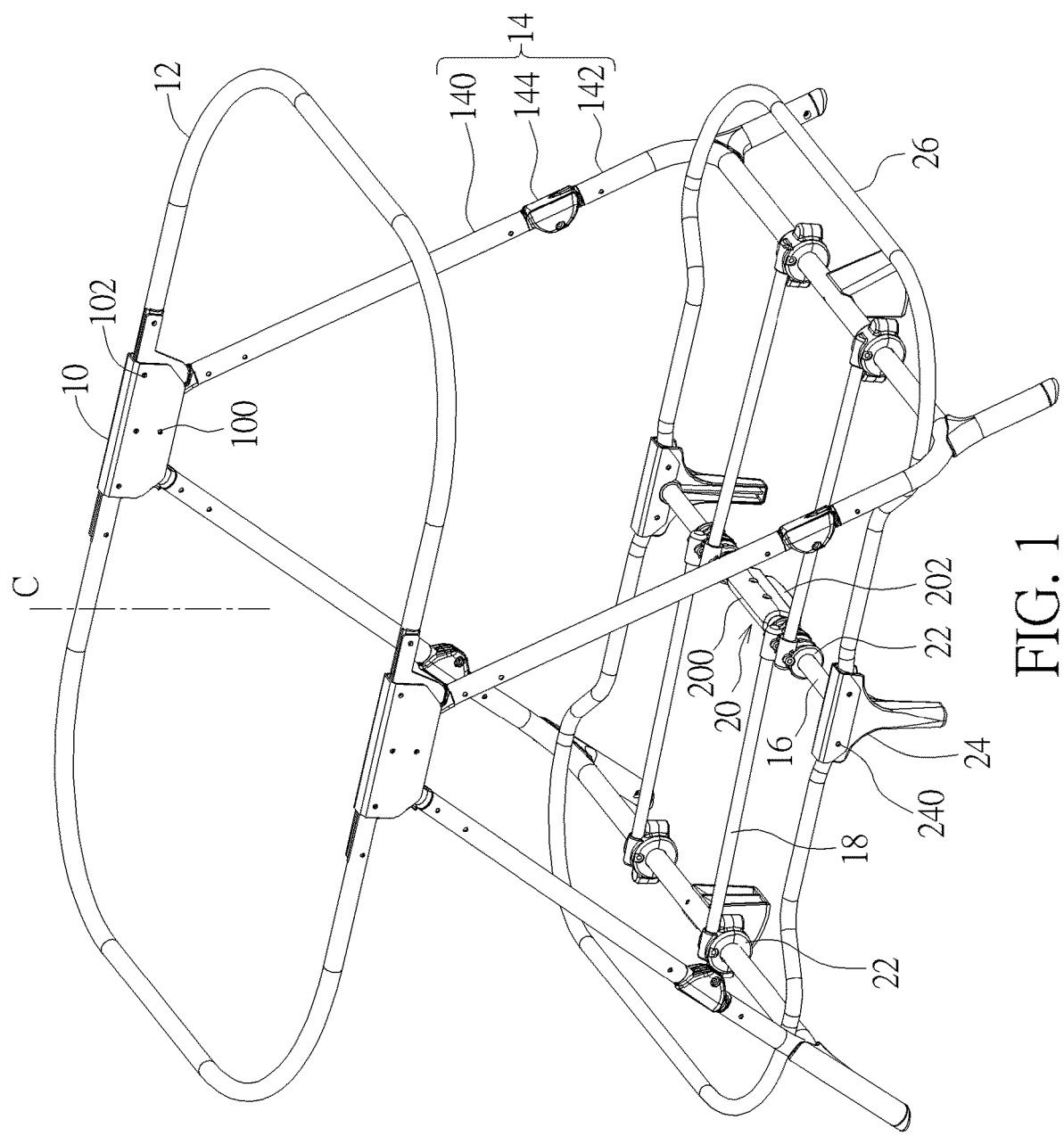
FIG. 1 is a perspective view illustrating a play yard according to an embodiment of the invention.
Figure 2:
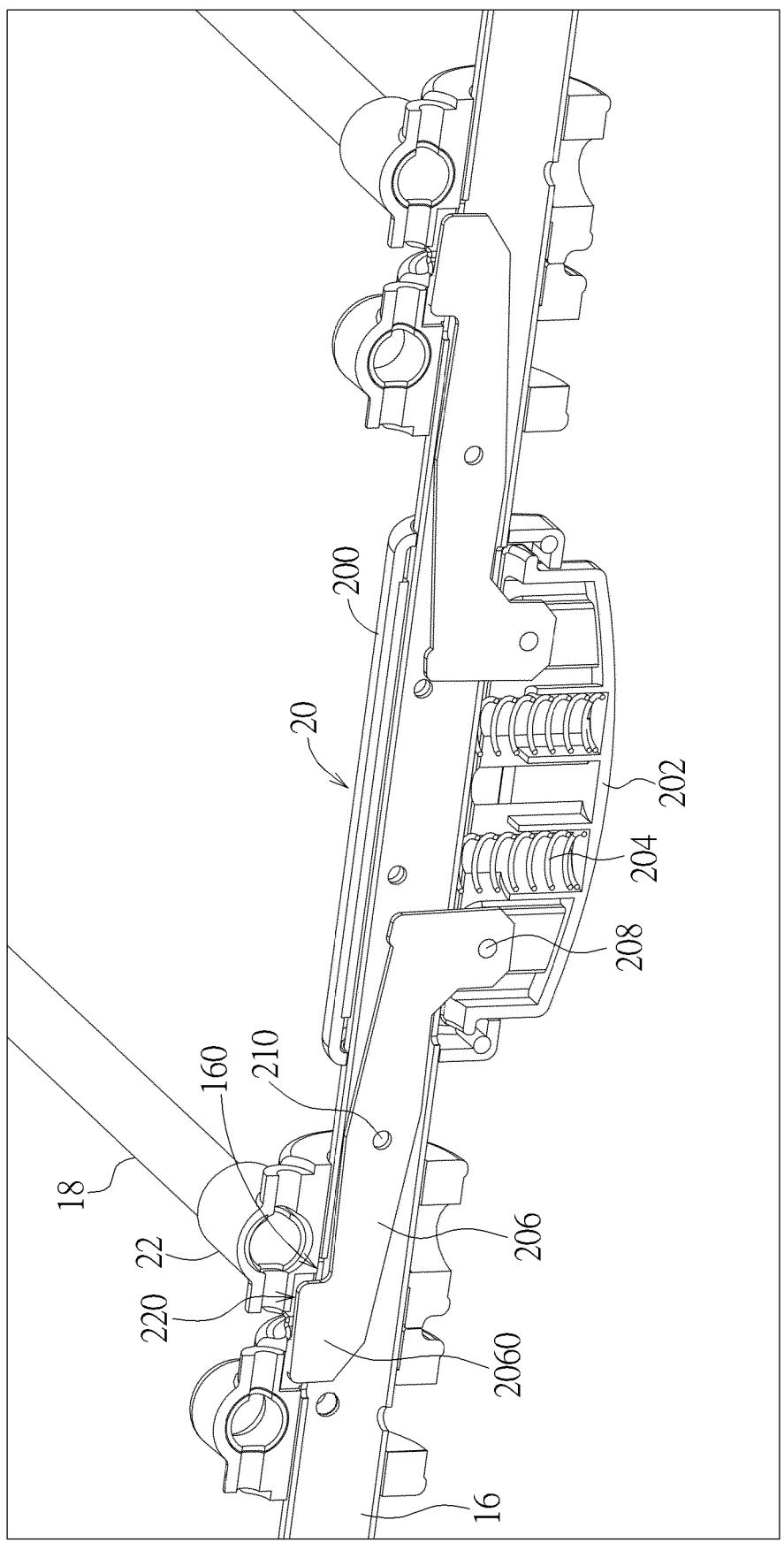
FIG. 2 is a sectional view illustrating the latch mechanism shown in FIG. 1.
Figure 3:
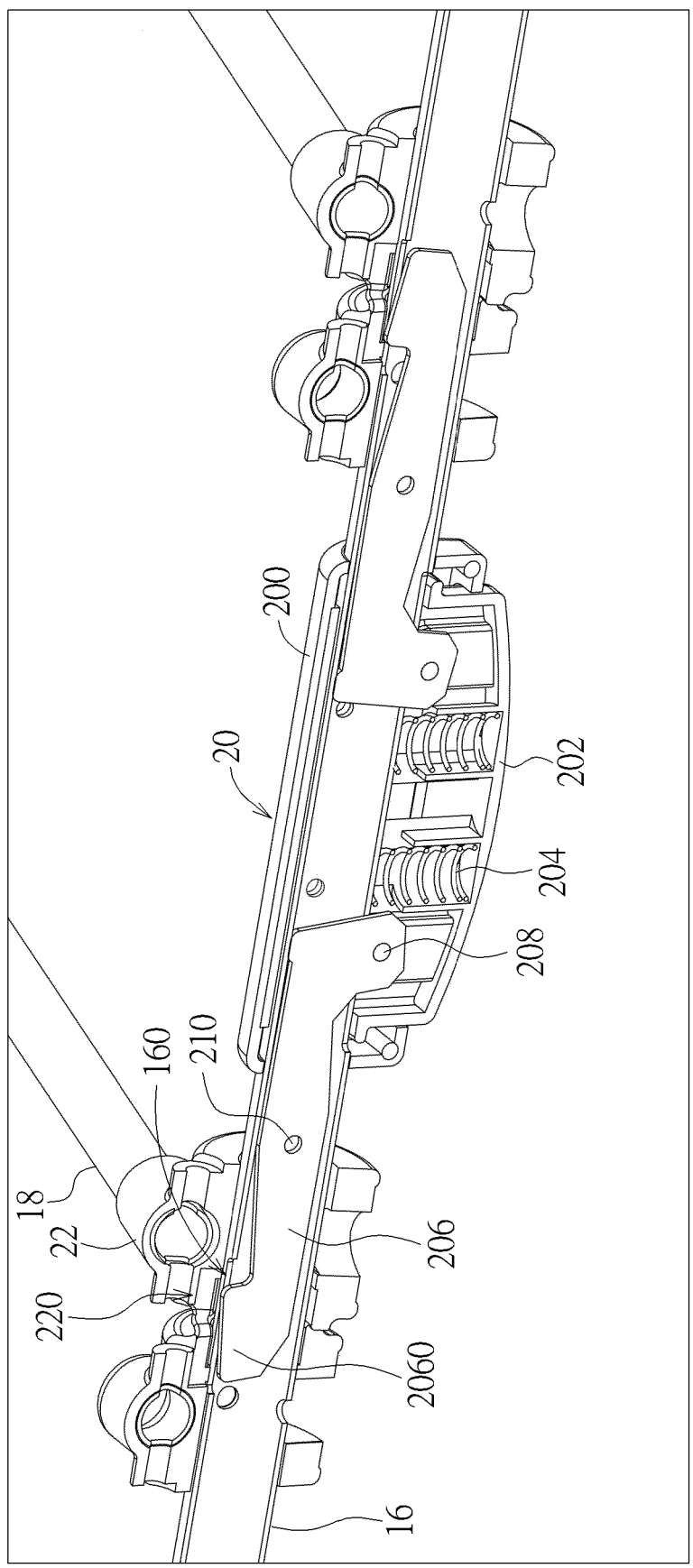
FIG. 3 is a sectional view illustrating the latch mechanism shown in FIG. 2 unlocking the connecting members.
Figure 4:
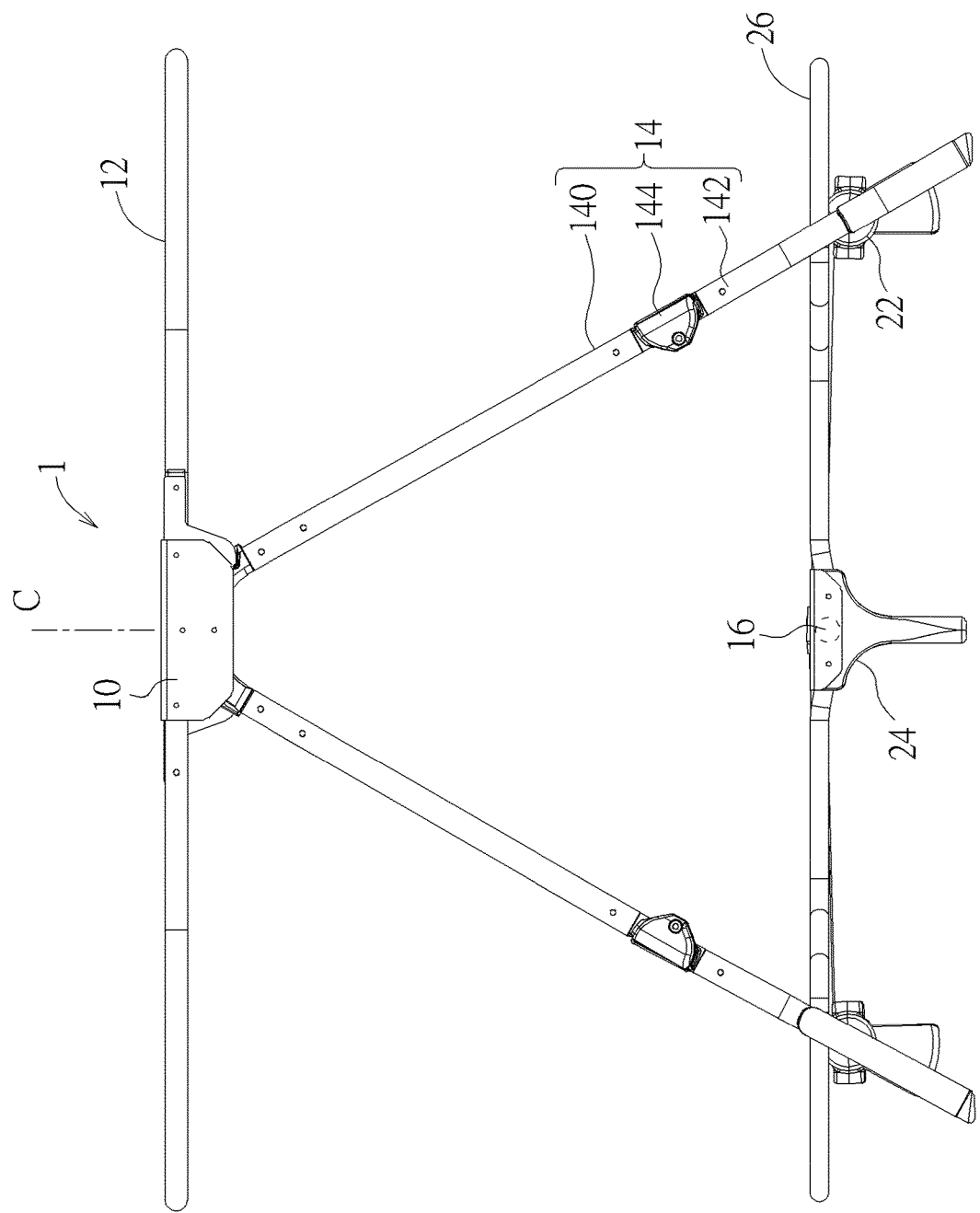
FIG. 4 is a side view illustrating the play yard shown in FIG. 1.
Figure 5:
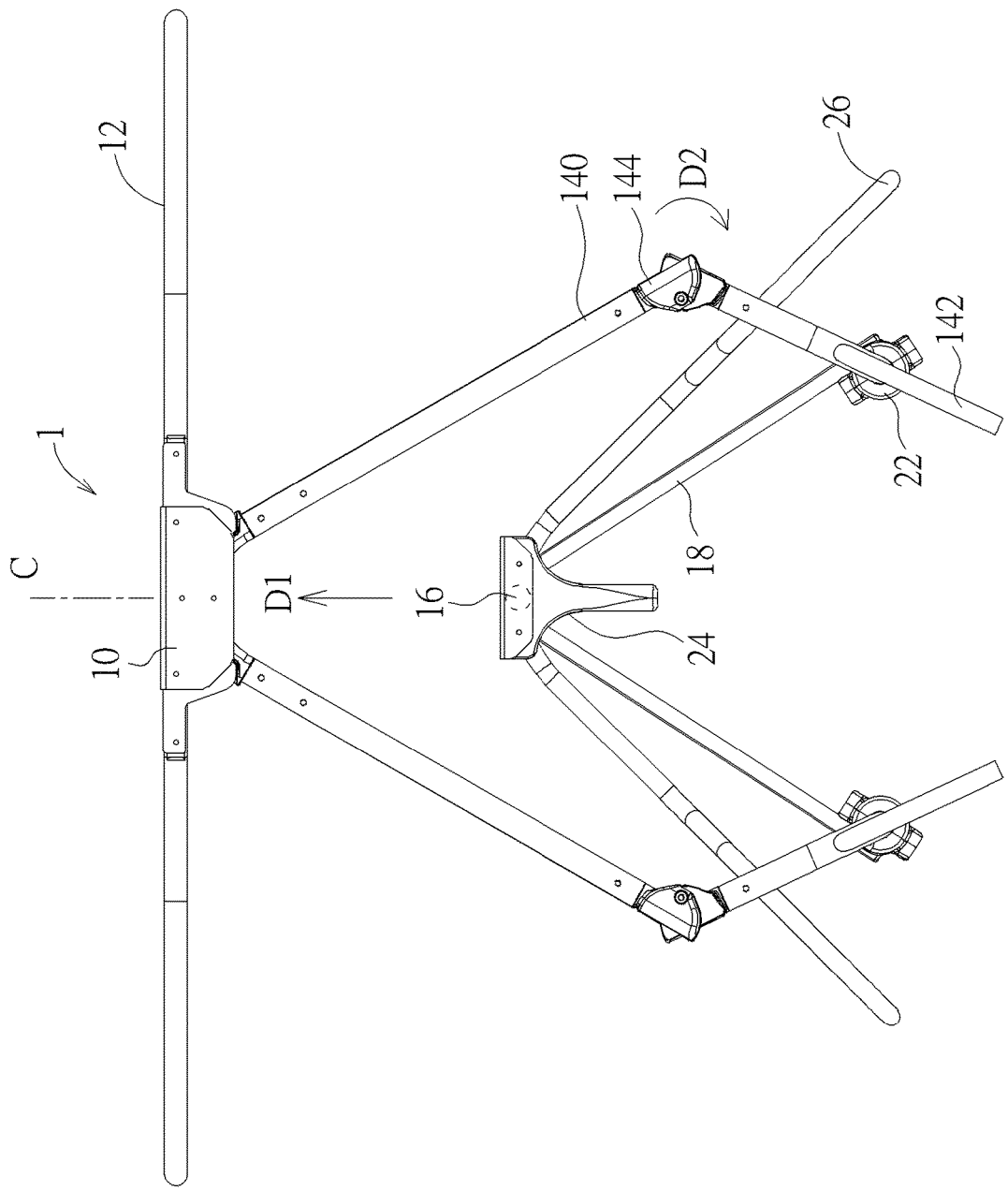
FIG. 5 is a side view illustrating the central member shown in FIG. 4 being lifted.
Figure 6:
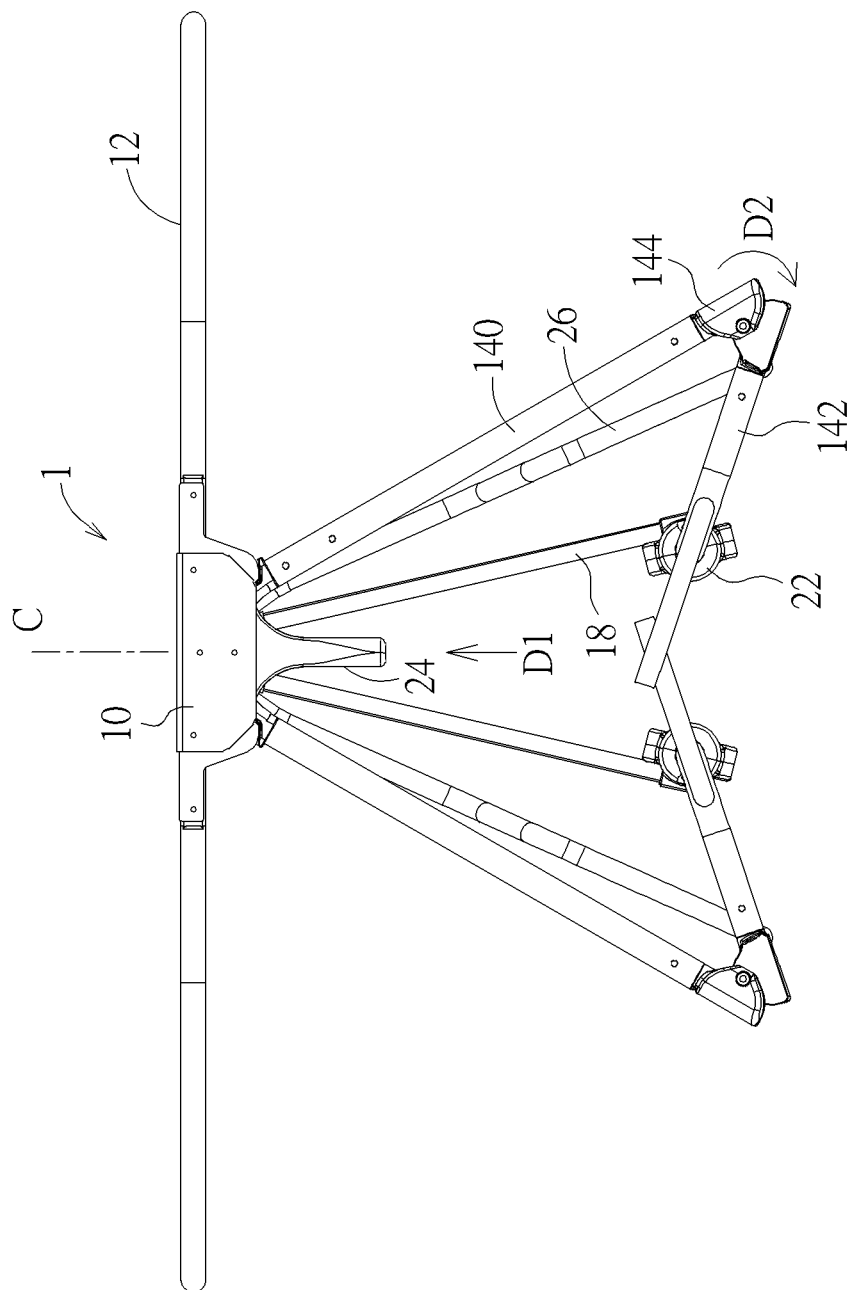
FIG. 6 is a side view illustrating the central member shown in FIG. 5 being lifted continuously.
Figure 7:
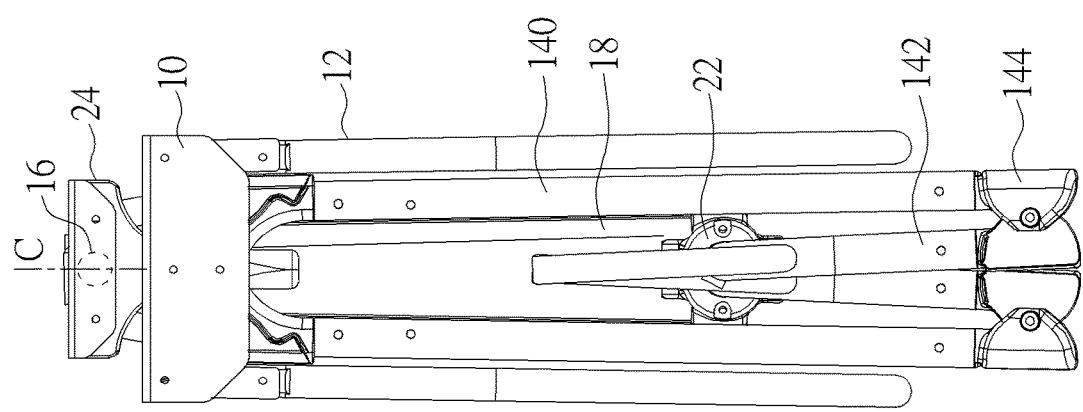
FIG. 7 is a side view illustrating the play yard shown in FIG. 6 being folded finally.

Referring to FIGS. 1 to 7, FIG. 1 is a perspective view illustrating a play yard 1 according to an embodiment of the invention, FIG. 2 is a sectional view illustrating the latch mechanism 20 shown in FIG. 1, FIG. 3 is a sectional view illustrating the latch mechanism 20 shown in FIG. 2 unlocking the connecting members 18, FIG. 4 is a side view illustrating the play yard 1 shown in FIG. 1, FIG. 5 is a side view illustrating the central member 16 shown in FIG. 4 being lifted, FIG. 6 is a side view illustrating the central member 16 shown in FIG. 5 being lifted continuously, and FIG. 7 is a side view illustrating the play yard 1 shown in FIG. 6 being folded finally.

As shown in FIG. 1, the play yard 1 comprises two brackets 10, two rail members 12, two support frames 14, a central member 16, a plurality of connecting members 18 and a latch mechanism 20. The rail members 12 are pivotally connected to the brackets 10. Each of the support frames 14 comprises two upper support members 140 and a lower support member 142, wherein the upper support members 140 are pivotally connected to the brackets 10 and the lower support member 142 is pivotally connected to the upper support members 140.

In this embodiment, the bracket 10 is U-shaped and has a central pivot axis 100 and two rail pivot axes 102. The rail members 12 are pivotally connected to the brackets 10 by the rail pivot axes 102. The upper support members 140 are pivotally connected to the brackets 10 by the central pivot axis 100. Furthermore, each of the support frames 14 comprises two first hinges 144 and the lower support member 142 is pivotally connected to the upper support members 140 by the first hinges 144.

The connecting members 18 are pivotally connected to the central member 16 and the lower support member 142. In this embodiment, the play yard 1 may further comprise a plurality of second hinges 22 disposed on the lower support member 142 and the central member 16. The connecting members 18 are pivotally connected to the central member 16 and the lower support member 142 by the second hinges 22. In this embodiment, the play yard 1 may further comprise two foot members 24 and two floating members 26. The central member 16 is connected to the foot members 24. The floating members 26 are pivotally connected to the foot members 24 by the floor pivot axes 240. The play yard 1 can be placed on a plane by the foot members 24 and the lower support members 142.

The latch mechanism 20 is configured to lock or unlock the connecting members 18, so as to unfold or fold the play yard 1. In this embodiment, the latch mechanism 20 is disposed on the central member 16, but is not so limited. In another embodiment, the latch mechanism 20 may be disposed at an appropriate position near the central member 16.

As shown in FIGS. 2 and 3, the central member 16 has a first slot 160 and the second hinge 22 disposed on the central member 16 has a second slot 220, wherein the second slot 220 is aligned with the first slot 160. The latch mechanism 20 comprises a casing 200, an actuating member 202, a resilient member 204 and a latch member 206. The casing 200 is disposed on the central member 16. The actuating member 202 is movably connected to the casing 200, such that the actuating member 202 can be depressed to a position shown in FIG. 3. The latch member 206 is pivotally connected to the actuating member 202 and the central member 16 by pivot axes 208, 210. The resilient member 204 is disposed between the actuating member 202 and the central member 16. In this embodiment, two resilient members 204 are disposed between the actuating member 202 and the central member 16, but are not so limited.

As shown in FIGS. 1 and 2, when the connecting member 18 is unfolded, a latch portion 2060 of the latch member 206 protrudes out of the first slot 160 of the central member 16 and engages with the second slot 220 of the second hinge 22, such that the latch member 206 locks the connecting member 18. When the latch member 206 of the latch mechanism 20 locks the connecting members 18, the rail members 12, the upper support members 140, the lower support members 142 and the connecting members 18 are unfolded with respect to each other, such that the play yard 1 is situated in the unfolded state shown in FIG. 1 stably. Accordingly, the latch mechanism 20 can prevent the play yard 1 from inadvertently folding by locking the second hinges 22 to the central member 16. Furthermore, when the latch mechanism 20 locks the connecting members 18, the floating members 26 are unfolded and rest on the lower support members 142, such that a mattress can be disposed on the floating members 26 and the connecting members 18.

If a user wants to fold the play yard 1 for shipment or storage, the user has to depress the actuating member 202 first. As shown in FIG. 3, when the actuating member 202 is depressed, the latch portion 2060 of the latch member 206 retracts from the first slot 160 of the central member 16 and disengages from the second slot 220 of the second hinge 22, such that the latch member 206 unlocks the connecting member 18. When the latch member 206 of the latch mechanism 20 unlocks the connecting members 18, the rail members 12, the upper support members 140, the lower support members 142, the connecting members 18 and the floating members 24 are able to be folded with respect to each other.

As shown in FIGS. 4 to 7, when the latch mechanism 20 unlocks the connecting members 18, the central member 16 is able to be lifted. When the central member 16 is lifted, the rail members 12, the upper support members 140, the lower support members 142, the connecting members 18 and the floating members 24 rotate toward a center C of the play yard 1, such that the rail members 12, the upper support members 140, the lower support members 142, the connecting members 18 and the floating members 24 are folded.

As shown in FIG. 5, when the central member 16 is lifted near the center C in a direction D1, the lower support members 142 are pulled toward the center C of the play yard 1 and rotate about the first hinges 144 in a direction D2. Furthermore, the connecting members 18 and the floating members 24 also rotate toward the center C of the play yard 1 in the direction D2. As shown in FIG. 6, as the central member 16 continues to lift in the direction D1, the lower support members 142, the connecting members 18 and the floating members 24 continues to rotate toward the center C of the play yard 1 in the direction D2. As shown in FIG. 7, as the central member 16 continues to lift in the direction D1, the lower support members 142 complete a full 180 degrees rotation in the direction D2 and rest against the inner side of the upper support members 140. Furthermore, the rail members 12 and the upper support members 140 also rotate toward the center C of the play yard 1 in the direction D2. Consequently, the play yard 1 is folded.

Figure 8:
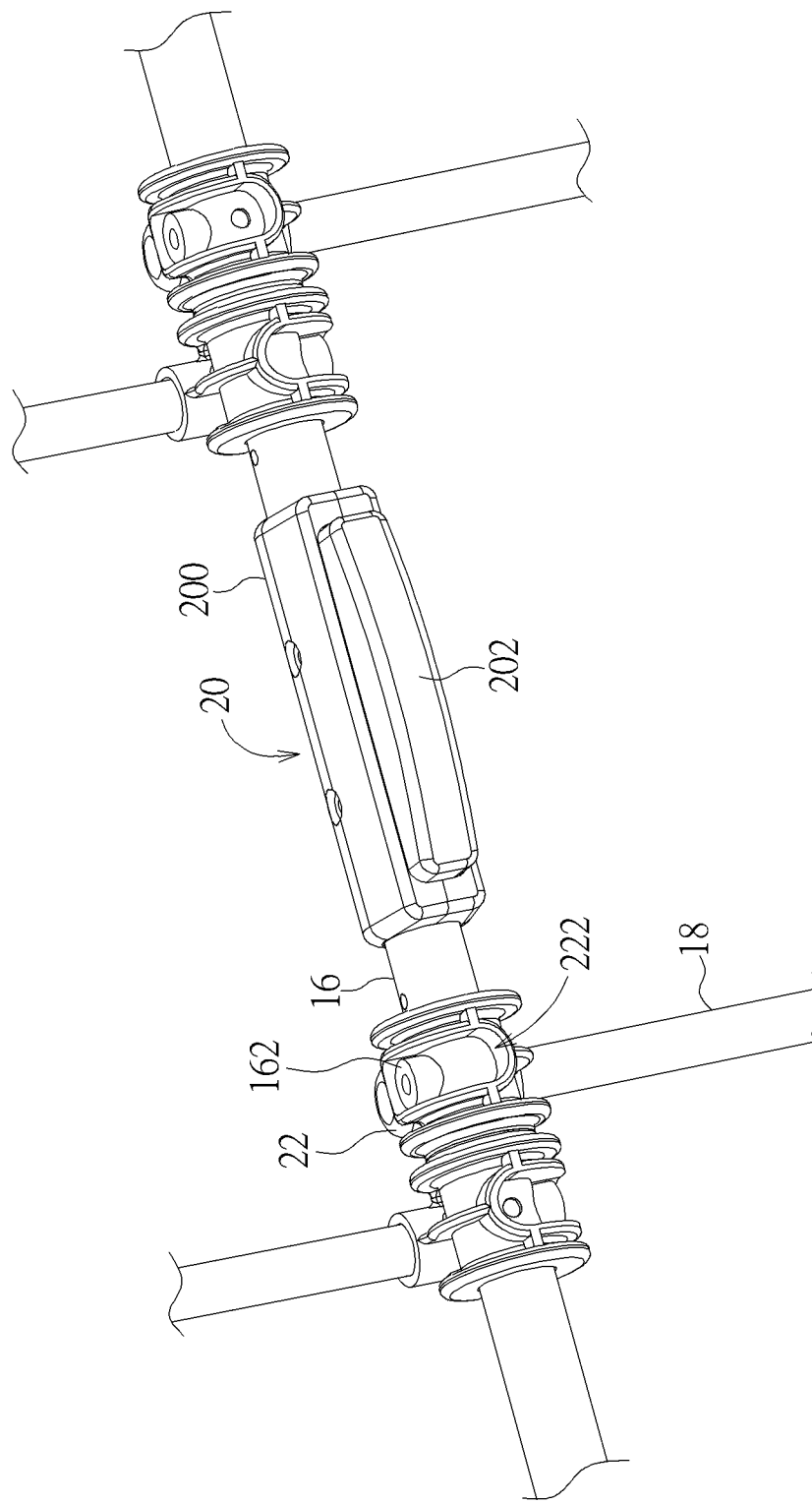
FIG. 8 is a perspective view illustrating the bottom of the central member shown in FIG. 1.

Referring to FIG. 8, FIG. 8 is a perspective view illustrating the bottom of the central member 16 shown in FIG. 1. As shown in FIG. 8, at least one of the second hinges 22 has a restraining groove 222 and the central member 16 has at least one restraining portion 162 located in the restraining groove 222. Accordingly, a rotation angle of the connecting member 18 is limited by the restraining portion 162 and the restraining groove 222 during the folding and unfolding process.

Figure 9:
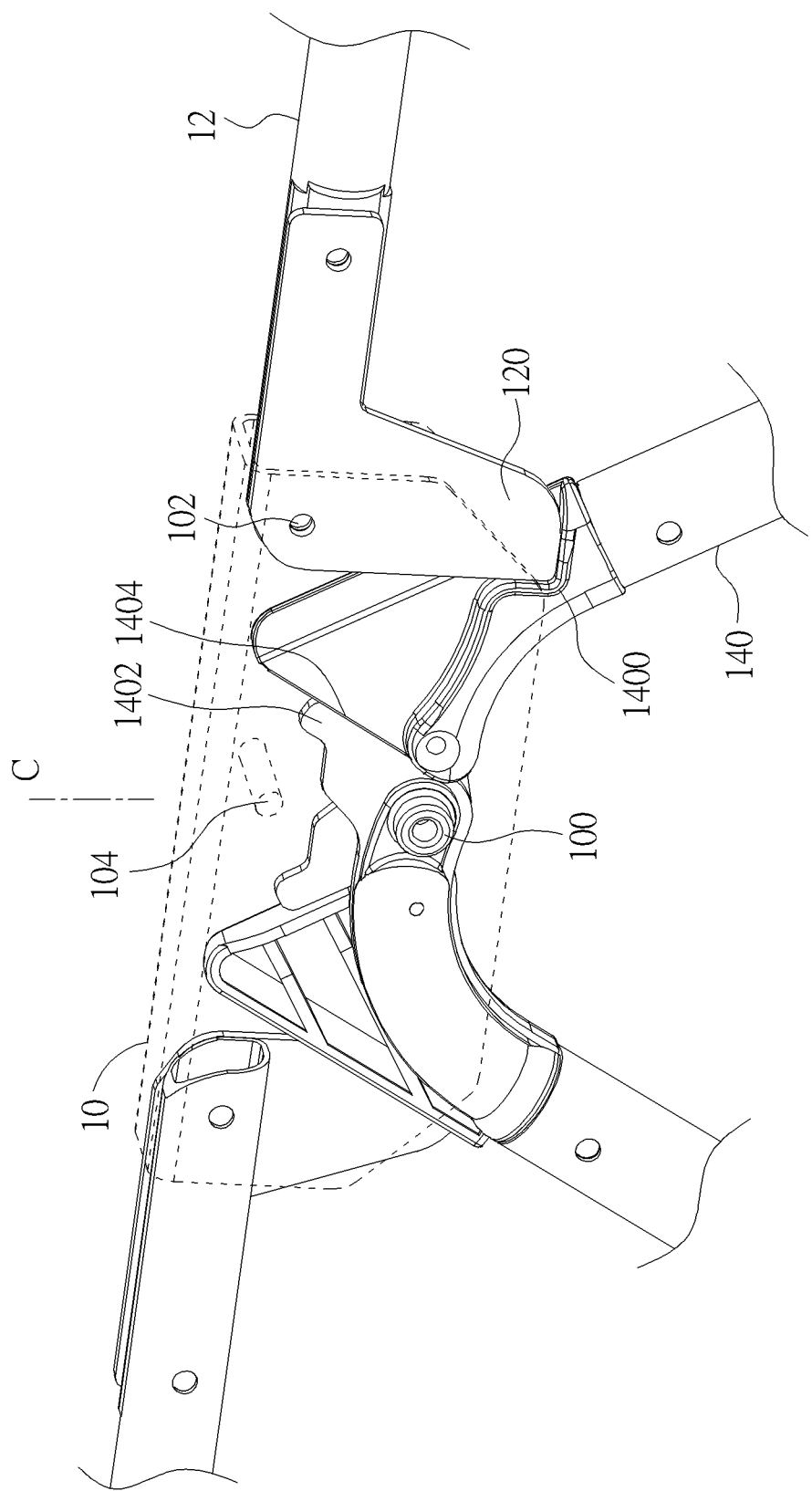
FIG. 9 is a perspective view illustrating the rail member and the upper support member shown in FIG. 1.
Figure 10:
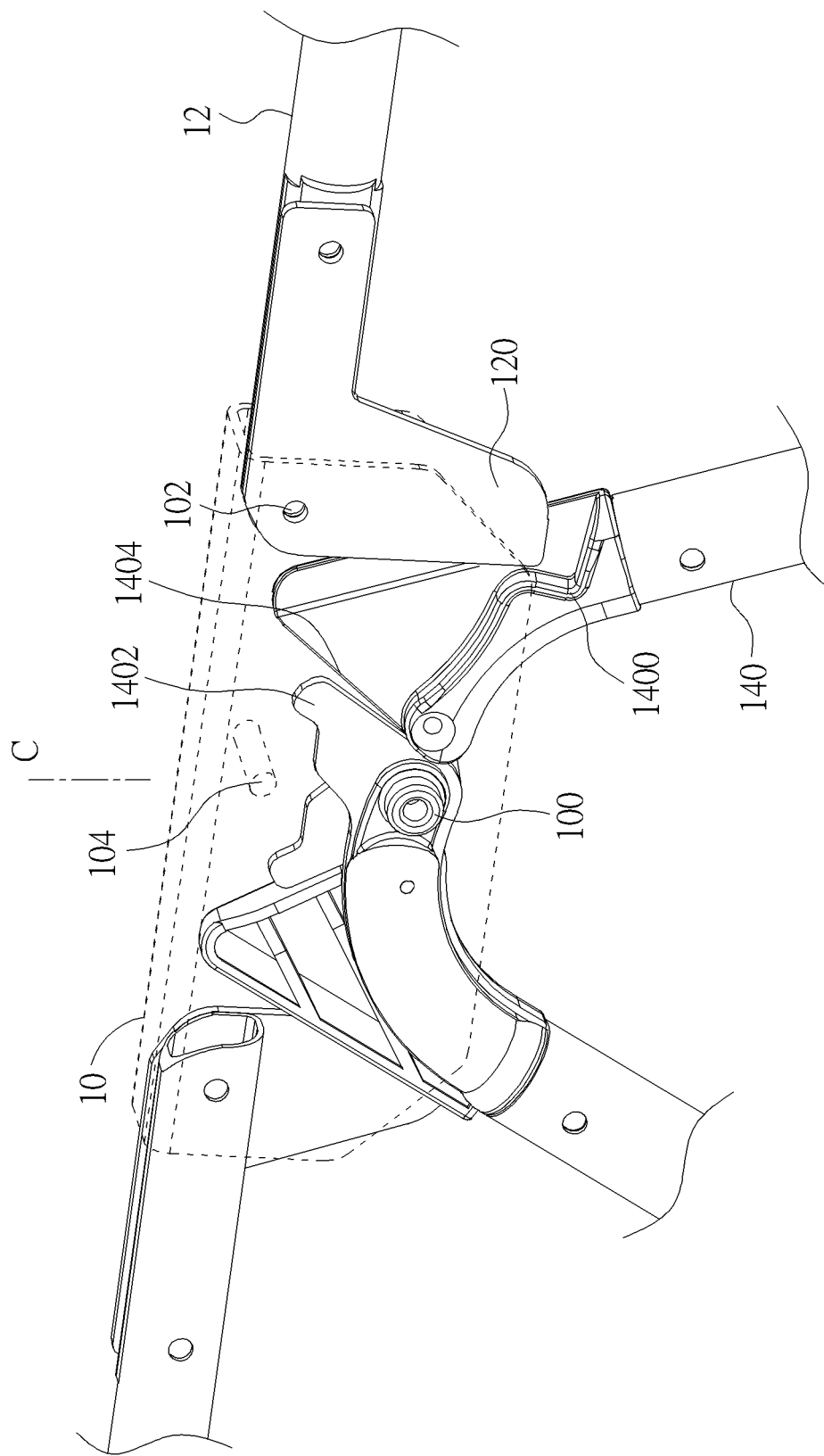
FIG. 10 is a perspective illustrating the upper support member shown in FIG. 9 rotating toward the center of the play yard.
Figure 11:
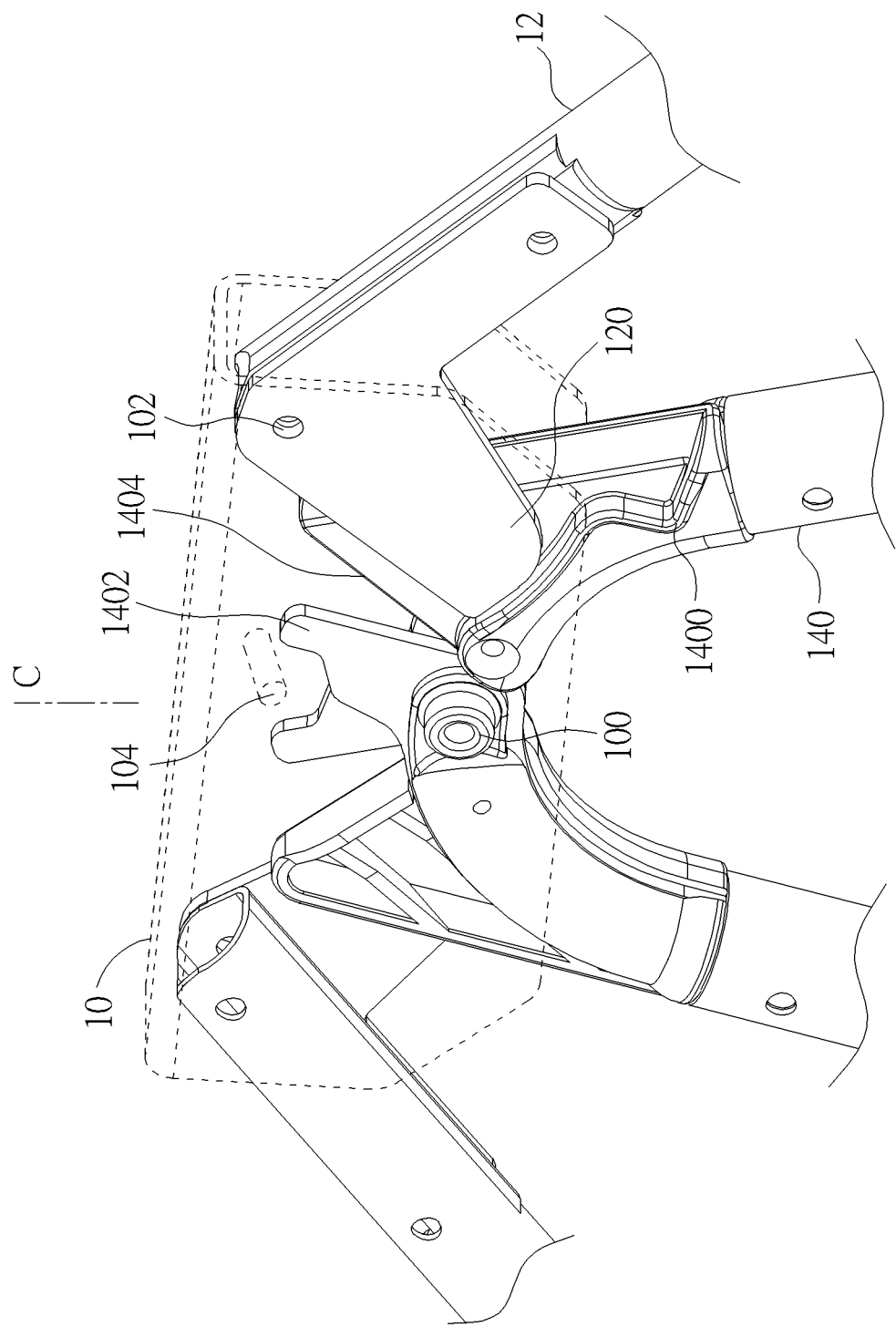
FIG. 11 is a perspective illustrating the upper support member shown in FIG. 10 rotating toward the center of the play yard continuously.

Referring to FIGS. 9 to 11, FIG. 9 is a perspective view illustrating the rail member 12 and the upper support member 140 shown in FIG. 1, FIG. 10 is a perspective illustrating the upper support member 140 shown in FIG. 9 rotating toward the center C of the play yard 1, and FIG. 11 is a perspective illustrating the upper support member 140 shown in FIG. 10 rotating toward the center C of the play yard 1 continuously.

As shown in FIG. 9, the rail member 12 has a first engaging portion 120 and the upper support member 140 has a second engaging portion 1400. When the rail member 12 and the upper support member 140 are unfolded with respect to each other, the first engaging portion 120 engages with the second engaging portion 1400, such that the rail member 12 is fixed in a horizontal position. Furthermore, the upper support member 140 has a first stop portion 1402 and a second stop portion 1404. When the upper support members 140 are unfolded, the first stop portion 1402 of one of the upper support members 140 abuts against the second stop portion 1404 of another one of the upper support members 140.

When the central member 16 is lifted (as mentioned in the above), the upper support member 140 rotates toward the center C of the play yard 1 to disengage the second engaging portion 1400 from the first engaging portion 120 (as shown in FIG. 10), such that the rail member 12 is able to rotate toward the center C of the play yard 1. As the central member 16 continues to lift, the second engaging portion 1400 drops and no longer engages with the first engaging portion 120, such that the rail member 12 can rotate freely toward the center C of the play yard 1.

In this embodiment, the bracket 10 may have a stop member 104. After the upper support member 140 rotates toward the center C of the play yard 1, the first stop portion 1402 abuts against the stop member 104, so as to hold the upper support member 140 in a perpendicular orientation relative to the bracket 10.

Figure 12:
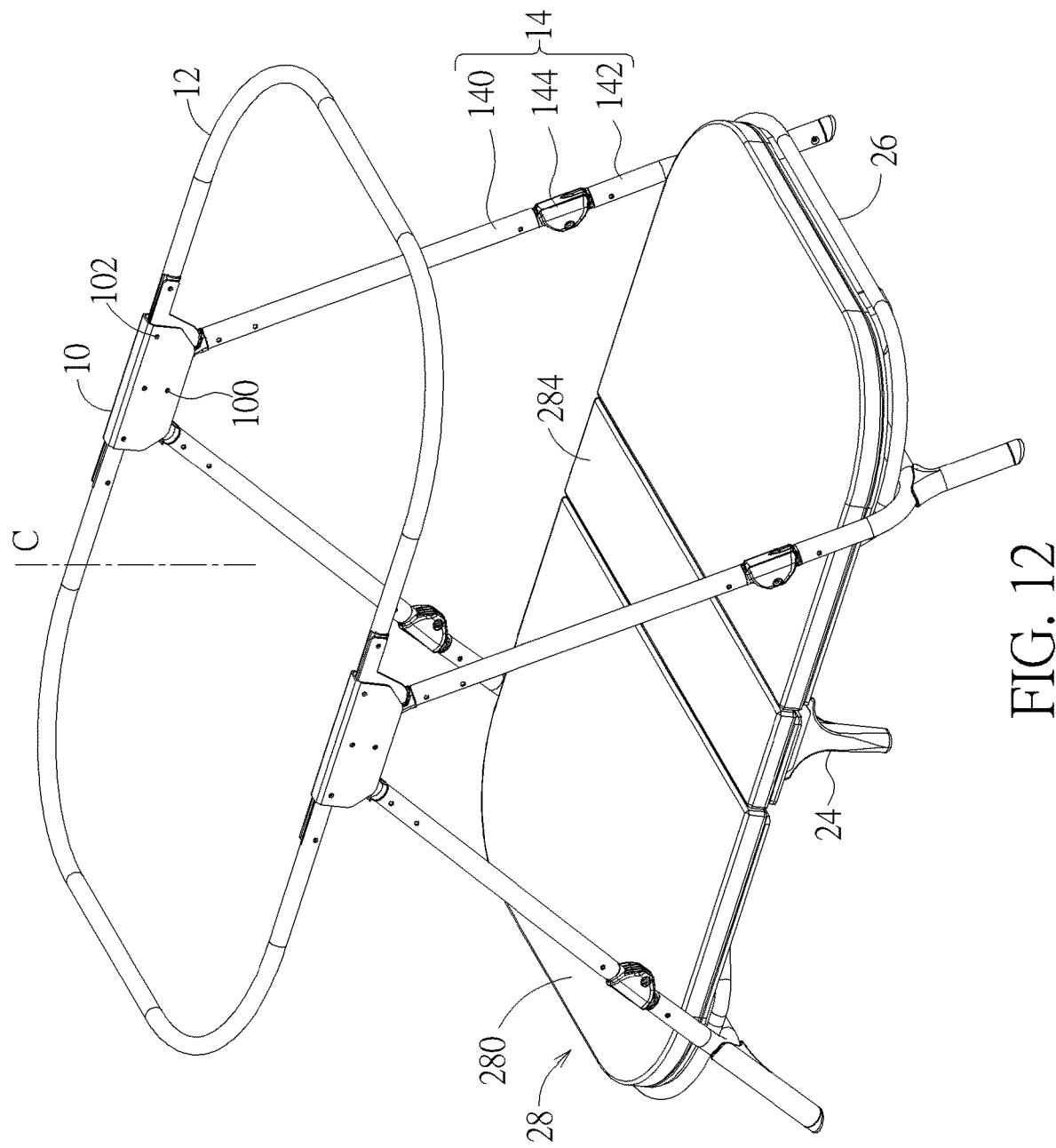
FIG. 12 is a perspective view illustrating a mattress disposed in the play yard.
Figure 13:
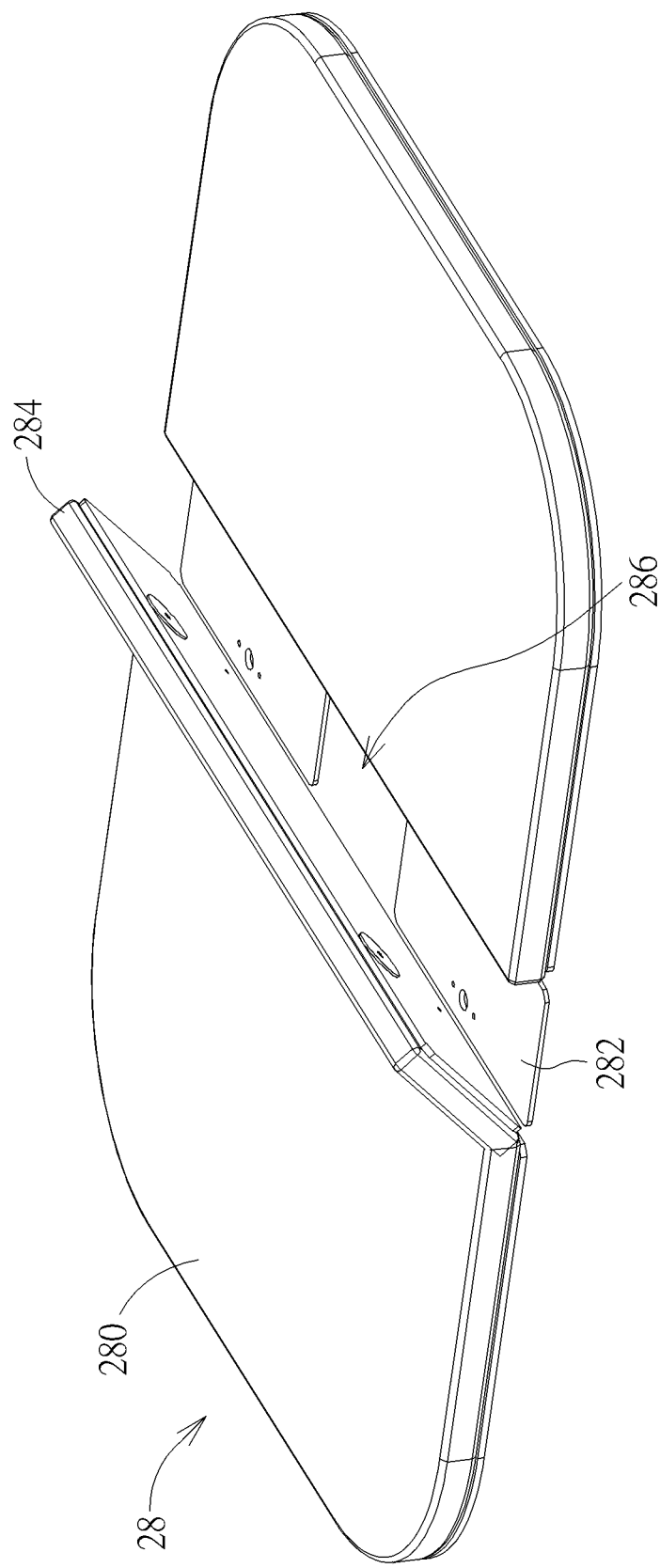
FIG. 13 is a perspective illustrating the mattress shown in FIG. 12.

Referring to FIGS. 12 and 13, FIG. 12 is a perspective view illustrating a mattress 28 disposed in the play yard 1 and FIG. 13 is a perspective illustrating the mattress 28 shown in FIG. 12. As shown in FIG. 12, the play yard 1 may further comprise a mattress 28 disposed in the play yard 1. As mentioned in the above, when the play yard 1 is unfolded, the mattress 28 can be disposed on the floating members 26 and the connecting members 18.

As shown in FIG. 13, the mattress 28 comprises two outer panels 280, a first central panel 282 and a second central panel 284. The outer panels 280 are pivotally connected to opposite sides of the first central panel 282. An access hole 286 is formed on the first central panel 282. The second central panel 284 is pivotally connected to one of the outer panels 280 and covers the first central panel 282. When the second central panel 284 is lifted, the access hole 286 is exposed, such that the latch mechanism 20 is able to be reached and operated to unlock the connecting member 18 and then the central member 16 is able to be lifted through the access hole 286.

In other words, when the mattress 28 is disposed in the play yard 1, the user can lift the second central panel 284, insert a hand into the access hole 286 to depress the actuating member 202 of the latch mechanism 20, and then lift the central member 16, so as to fold the play yard 1 with the mattress 28. When the first central panel 282 is lifted together with the central member 16, the outer panels 280 rotate toward the center C of the play yard 1 together with the floating members 26. Accordingly, the user need not remove the mattress 28 from the play yard 1 while folding the play yard 1.

Figure 14:
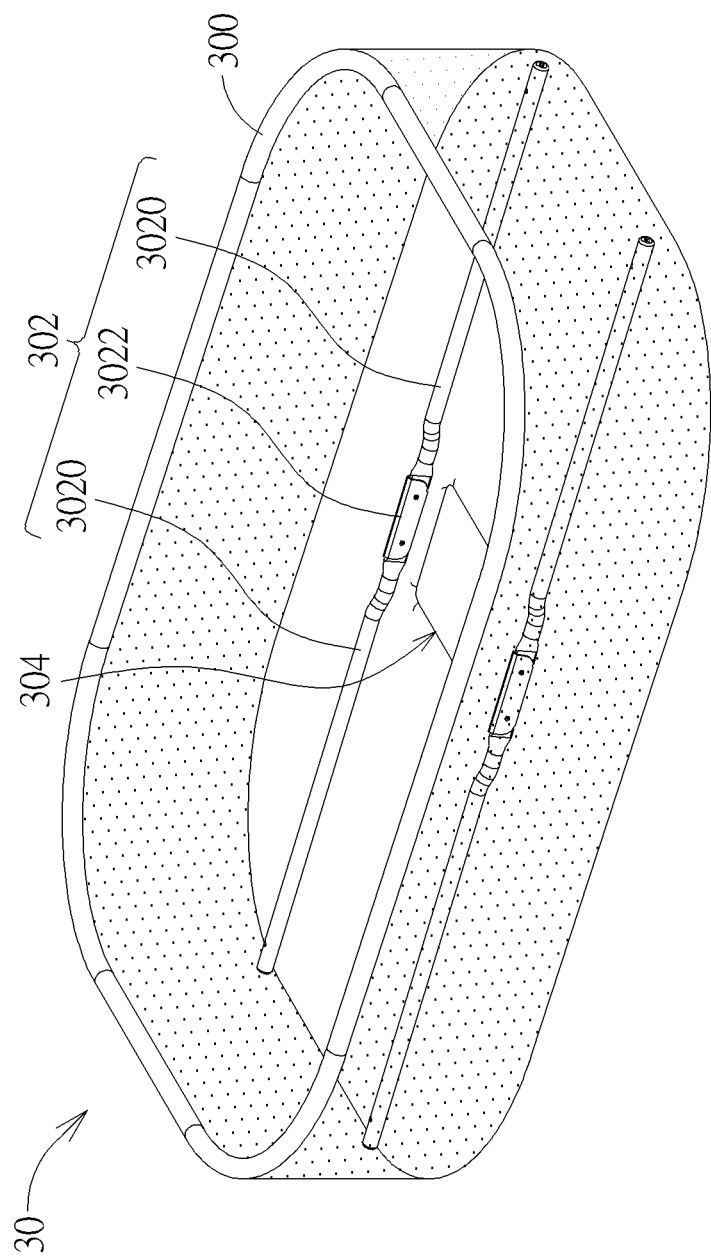
FIG. 14 is a perspective view illustrating a bassinet assembly according to an embodiment of the invention.

Referring to FIG. 14, FIG. 14 is a perspective view illustrating a bassinet assembly 30 according to an embodiment of the invention. As shown in FIG. 14, the play yard 1 may further comprise a bassinet assembly 30. The bassinet assembly 30 may be placed within the play yard 1, for example, by being connected with fabrics (not shown) of the rail members 12, or by being hung on the rail members 12.

The bassinet assembly 30 comprises a fabric structure 300 and two support structures 302. The fabric structure 300 is connected with or hung on the rail members 12. The support structures 302 are disposed in the fabric structure 300 and configured to support the aforesaid mattress 28. In this embodiment, each of the support structures 302 comprises two rods 3020 and a pivot member 3022, wherein the rods 3020 are pivotally connected to opposite ends of the pivot member 3022.

Furthermore, a through hole 304 is formed on a bottom of the fabric structure 300, such that the latch mechanism 20 is able to be reached and operated to unlock the connecting member 18 and then the central member 16 is able to be lifted through the through hole 304. In other words, when the bassinet assembly 30 is hung on the rail members 12 of the play yard 1, the user can insert a hand into the through hole 304 to depress the actuating member 202 of the latch mechanism 20 and then lift the central member 16, so as to fold the play yard 1 with the bassinet assembly 30. When the central member 16 is lifted, the rods 3020 rotate toward the center C of the play yard 1 with respect to the pivot member 3022. Accordingly, the user need not remove the bassinet assembly 30 from the play yard 1 while folding the play yard 1.

Figure 15:
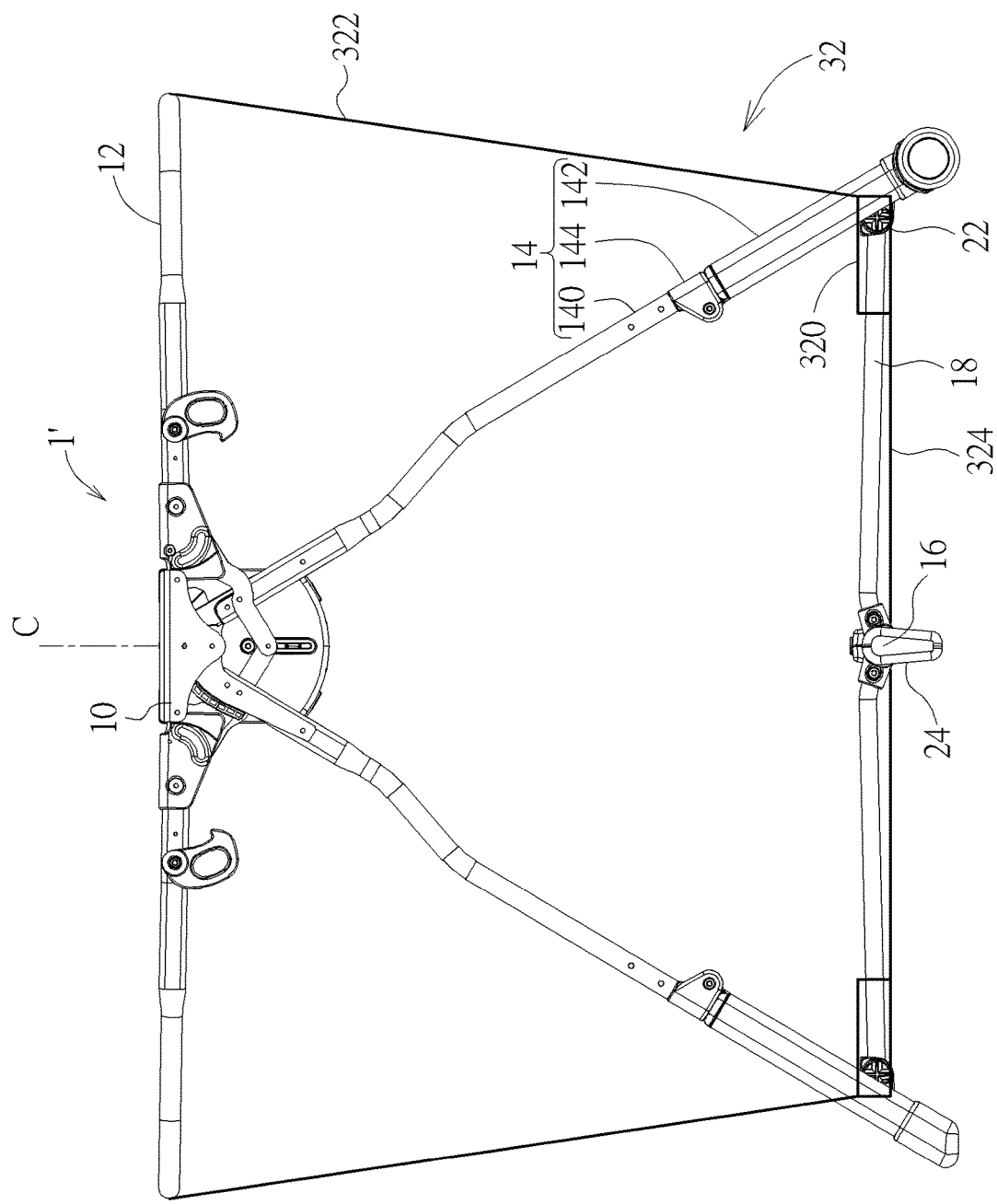
FIG. 15 is a side view illustrating a play yard according to another embodiment of the invention.
Figure 16:
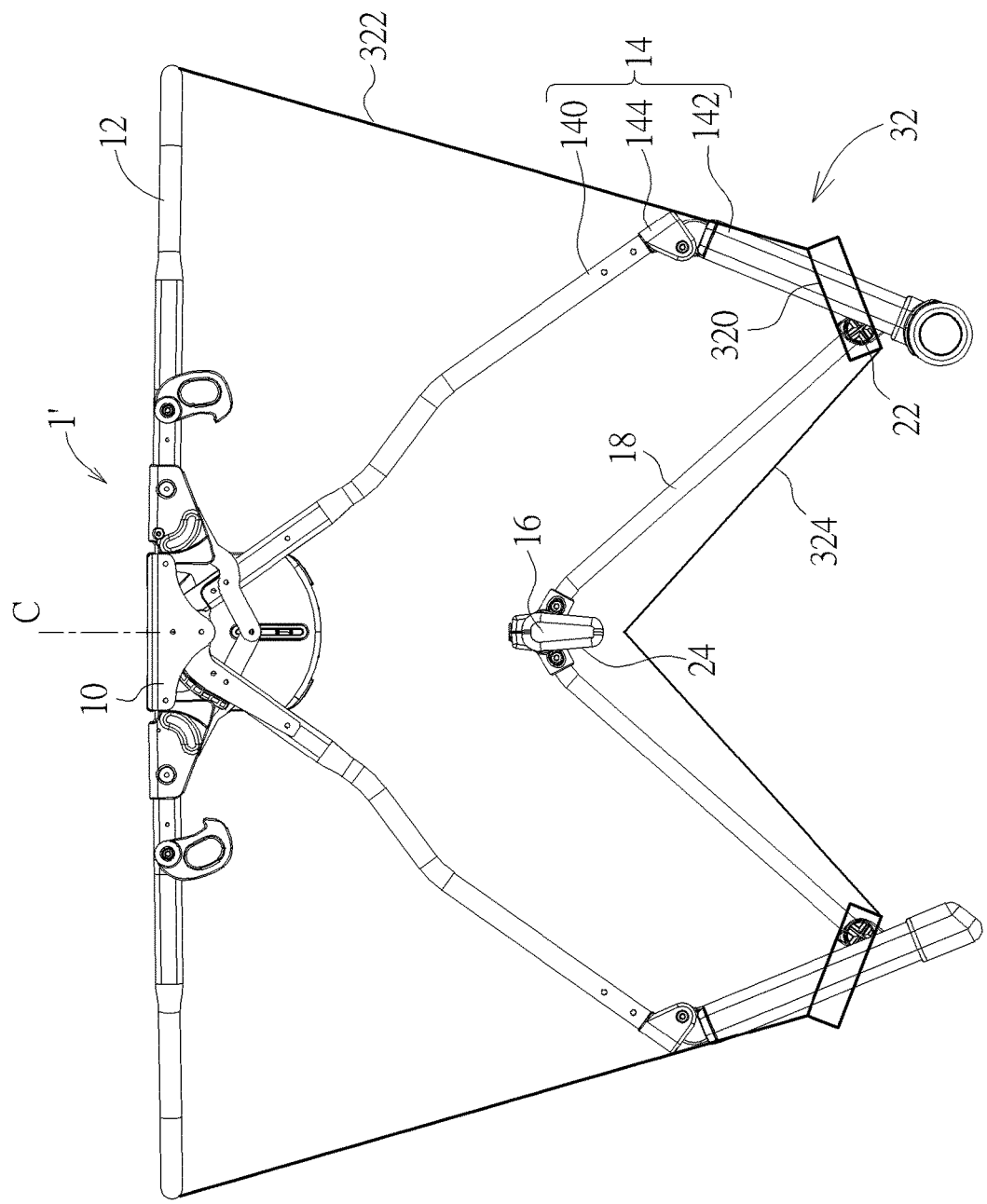
FIG. 16 is a side view illustrating the central member shown in FIG. 15 being lifted.

Referring to FIGS. 15 and 16, FIG. 15 is a side view illustrating a play yard 1' according to another embodiment of the invention and FIG. 16 is a side view illustrating the central member 16 shown in FIG. 15 being lifted. It should be noted that the same elements in FIGS. 15-16 and FIGS. 1-14 are represented by the same numerals, so the repeated explanation will not be depicted herein again.

As shown in FIGS. 15 and 16, the play yard 1' further comprises a softgoods clothing 32 covering the rail members 12, the support frames 14, the central member 16 and the connecting members 18. In this embodiment, the softgoods clothing 32 has a tunnel 320. The second hinge 22 on the lower support member 142 is accommodated in the tunnel 320. The tunnel 320 allows the second hinge 22 to slide from one end to another end as the central member 16 is lifted.

When the central member 16 is lifted in the direction D1, the connecting members 18 pull the lower support members 142 toward the center C of the play yard 1'. While the lower support members 142 are pulled together, the tension on the side wall 322 of the softgoods clothing 32 pulls the tunnel 320 in a manner that causes the outer second hinge 22 to slide from one end of the tunnel 320 to another end. Then, the tunnel 320 begins to pull up the outer wall of the play yard 1', in line with the side wall 322 of the softgoods clothing 32, while the bottom portion 324 of the softgoods clothing 32 drops away from the connecting members 18. Accordingly, the play yard 1' will not fold if the outer second hinge 22 is not allowed to slide inwardly along the aforementioned path of the tunnel 320.

Figure 17:
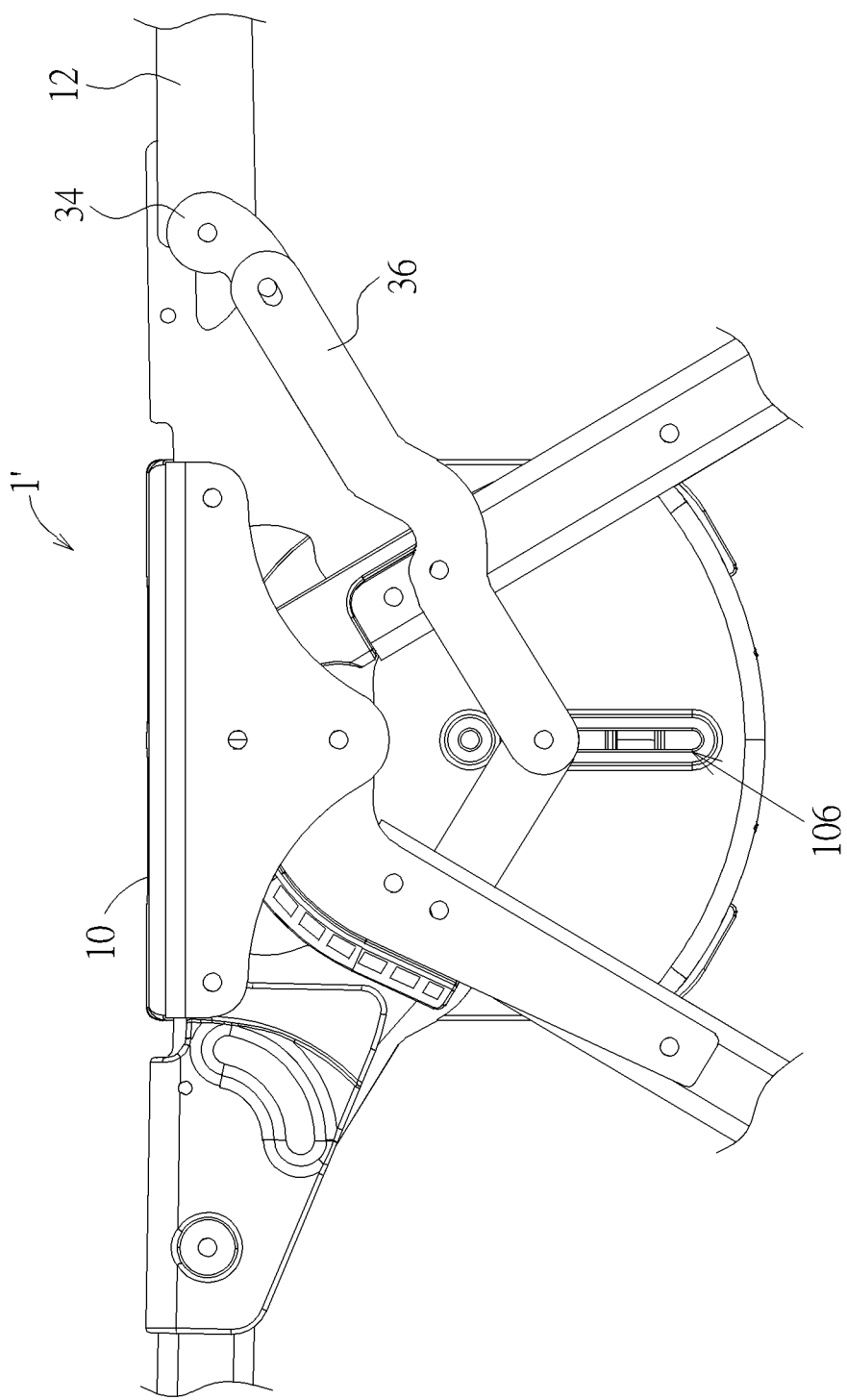
FIG. 17 is a side view illustrating the bracket and the rail member shown in FIG. 15.

Referring to FIG. 17, FIG. 17 is a side view illustrating the bracket 10 and the rail member 12 shown in FIG. 15. As shown in FIG. 17, the play yard 1' further comprises a first linkage member 34 and a second linkage member 36. Furthermore, the bracket 10 has a sliding groove 106. The first linkage member 34 is pivotally connected to the rail member 12 and the second linkage member 36. The second linkage member 36 is pivotally connected to the sliding groove 106. Accordingly, the second linkage member 36 can rotate and slide with respect to the sliding groove 106 as the rail member 12 is being folded or unfolded. By means of the first linkage member 34, the second linkage member 36 and the sliding groove 106, they can help the folding and unfolding process to operate in a balanced and consistent manner.

Figure 18:
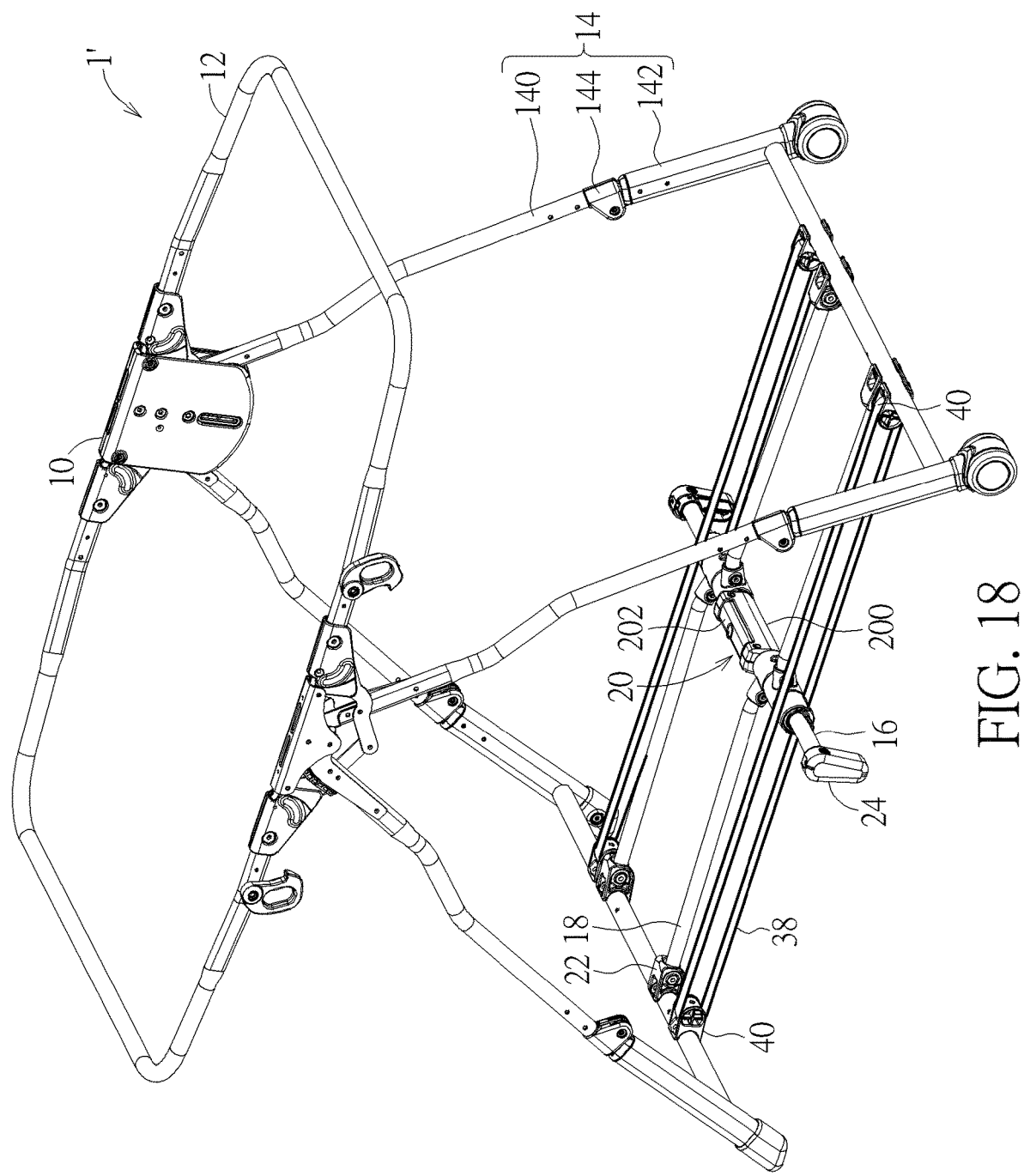
FIG. 18 is a perspective view illustrating the play yard shown in FIG. 15.
Figure 19:
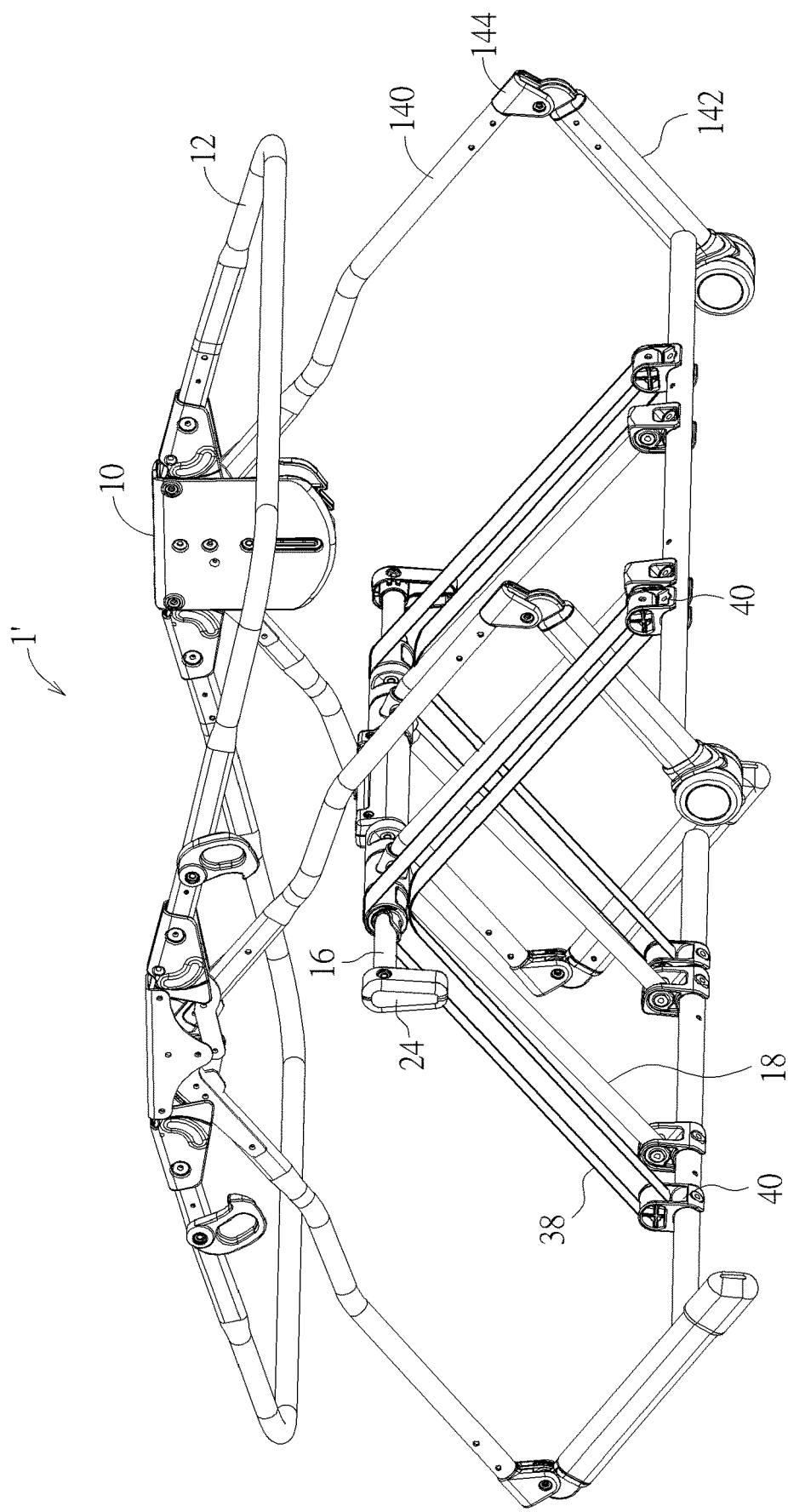
FIG. 19 is a perspective view illustrating the central member shown in FIG. 18 being lifted.

Referring to FIGS. 18 and 19, FIG. 18 is a perspective view illustrating the play yard 1' shown in FIG. 15 and FIG. 19 is a perspective view illustrating the central member 16 shown in FIG. 18 being lifted. As shown in FIGS. 18 and 19, the play yard 1' further comprises at least one webbing strap 38 and at least two pulleys 40. The pulleys 40 are disposed on the lower support members 142 and the webbing strap 38 is wound around the pulleys 40. When the central member 16 is lifted, the pulleys 40 and the webbing strap 38 force the lower support members 142 to rotate toward one another at a balanced angular motion to allow the lower support members 142 to pass one another cleanly without interference. It should be noted that, the actuating member 202 of the latch mechanism 20 is disposed on the top of the casing 200, so the user can depress the actuating member 202 downwardly to unlock the connecting member 18.

As mentioned in the above, the invention utilizes the latch mechanism to lock or unlock the connecting members, so as to unfold or fold the play yard. When the rail members, the upper support members, the lower support member and the connecting members are unfolded with respect to each other, the latch mechanism locks the connecting members, such that the play yard can be situated in the unfolded state stably. If a user wants to fold the play yard for shipment or storage, the user can operate the latch mechanism to unlock the connecting members and then lift the central member, such that the rail members, the upper support members, the lower support member and the connecting members rotate toward the center of the play yard. Consequently, the rail members, the upper support members, the lower support member and the connecting members are folded with respect to each other. Accordingly, the folding and unfolding process of the play yard of the invention can be performed with minimal steps, such that the operation is very convenient for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A play yard comprising:
   two brackets;
   two rail members pivotally connected to the brackets;
   two support frames, each of the support frames comprising two upper support members, a lower support member and two first hinges, the upper support members being pivotally connected to the brackets, the lower support member being pivotally connected to the upper support members, by the first hinges;
   a central member;
   a plurality of second hinges disposed on the lower support member and the central member;
   a plurality of connecting members pivotally connected to the central member and the lower support member by the second hinges; and
   a latch mechanism configured to lock or unlock the connecting members;
   wherein when the latch mechanism locks the connecting members, the rail members, the upper support members, the lower support member and the connecting members are unfolded with respect to each other; when the latch mechanism unlocks the connecting members, the rail members, the upper support members, the lower support member and the connecting members are able to be folded with respect to each other;
   wherein at least one of the second hinges has a restraining groove, the central member has at least one restraining portion located in the restraining groove, and a rotation angle of each connecting member is limited by the at least one restraining portion and the restraining groove.

2. The play yard of claim 1, wherein the latch mechanism is disposed on the central member; when the latch mechanism unlocks the connecting members, the central member is able to be lifted; when the central member is lifted, the rail members, the upper support members, the lower support member and the connecting members rotate toward a center of the play yard.

3. The play yard of claim 1, wherein each rail member has a first engaging portion and each upper support member has a second engaging portion; when each rail member and each upper support member are unfolded with respect to each other, the first engaging portion engages with the second engaging portion, such that each rail member is fixed in a horizontal position; when the central member is lifted, the upper support member rotates toward a center of the play yard to disengage the second engaging portion from the first engaging portion, such that each rail member is able to rotate toward the center of the play yard.

4. The play yard of claim 1, wherein each upper support member has a first stop portion and a second stop portion; when the upper support members are unfolded, the first stop portion of one of the upper support members abuts against the second stop portion of another one of the upper support members.

5. The play yard of claim 4, wherein each bracket has a stop member; after each upper support member rotates toward a center of the play yard, the first stop portion abuts against the stop member.

6. The play yard of claim 1, further comprising a softgoods clothing covering the rail members, the support frames, the central member and the connecting members, wherein the softgoods clothing has a tunnel, the second hinge on the lower support member is accommodated in the tunnel, and the tunnel allows the second hinge to slide from one end to another end as the central member is lifted.

7. The play yard of claim 1, wherein the central member has a first slot, at least one of the second hinges has a second slot aligned with the first slot, the latch mechanism comprises a casing, an actuating member, a resilient member and a latch member, the casing is disposed on the central member, the actuating member is movably connected to the casing, the latch member is pivotally connected to the actuating member and the central member, the resilient member is disposed between the actuating member and the central member; when each connecting member is unfolded, a latch portion of the latch member protrudes out of the first slot and engages with the second slot, such that the latch member locks each connecting member; when the actuating member is depressed, the latch portion retracts from the first slot and disengages from the second slot, such that the latch member unlocks each connecting member.

8. The play yard of claim 1, further comprising two foot members and two floating members, the central member being connected to the foot members, the floating members being pivotally connected to the foot members, wherein when the latch mechanism locks the connecting members, the floating members are unfolded and rest on the lower support members; when the central member is lifted, the floating members rotate toward a center of the play yard, such that the floating members are folded.

9. The play yard of claim 1, further comprising a mattress disposed in the play yard, the mattress comprising two outer panels, a first central panel and a second central panel, the outer panels being pivotally connected to opposite sides of the first central panel, an access hole being formed on the first central panel, the second central panel being pivotally connected to one of the outer panels and covering the first central panel, wherein when the second central panel is lifted, the access hole is exposed, such that the latch mechanism is able to be operated to unlock the connecting members and the central member is able to be lifted through the access hole.

10. The play yard of claim 1, further comprising a bassinet assembly, the bassinet assembly comprising a fabric structure and two support structures, the fabric structure being hung on the rail members, the support structures being disposed in the fabric structure and configured to support a mattress.

11. The play yard of claim 10, wherein a through hole is formed on a bottom of the fabric structure, such that the latch mechanism is able to be operated to unlock the connecting members and the central member is able to be lifted through the through hole.

12. The play yard of claim 10, wherein each of the support structures comprises two rods and a pivot member, the rods are pivotally connected to the pivot member.

13. The play yard of claim 1, further comprising a first linkage member and a second linkage member, the bracket having a sliding groove, the first linkage member being pivotally connected to the rail member and the second linkage member, the second linkage member being pivotally connected to the sliding groove, the second linkage member rotating and sliding with respect to the sliding groove as the rail member is being folded or unfolded.

14. The play yard of claim 1, further comprising at least one webbing strap and at least two pulleys, the pulleys being disposed on the lower support members, the webbing strap being wound around the pulleys.

* * * * *